(12) United States Patent
Cheng

(10) Patent No.: US 10,636,191 B2
(45) Date of Patent: Apr. 28, 2020

(54) METHOD AND APPARATUS OF DISPLAYING WINDOW BORDER SHADOW

(71) Applicant: GUANGZHOU SHIRUI ELECTRONICS CO. LTD., Guangzhou (CN)

(72) Inventor: Yao Cheng, Guangzhou (CN)

(73) Assignee: GUANGZHOU SHIRUI ELECTRONICS CO. LTD., Guangzhou, Guangdong (CN)

( * ) Notice: Subject to any disclaimer, the term of this patent is extended or adjusted under 35 U.S.C. 154(b) by 0 days.

(21) Appl. No.: 16/308,728

(22) PCT Filed: Dec. 29, 2016

(86) PCT No.: PCT/CN2016/113224
§ 371 (c)(1),
(2) Date: Dec. 10, 2018

(87) PCT Pub. No.: WO2017/215247
PCT Pub. Date: Dec. 21, 2017

(65) Prior Publication Data
US 2019/0147634 A1 May 16, 2019

(30) Foreign Application Priority Data
Jun. 12, 2016 (CN) .......................... 2016 1 0417380

(51) Int. Cl.
*G06T 11/60* (2006.01)
*G06F 3/0481* (2013.01)
*G09G 5/377* (2006.01)

(52) U.S. Cl.
CPC ............ *G06T 11/60* (2013.01); *G06F 3/0481* (2013.01); *G09G 5/377* (2013.01);
(Continued)

(58) Field of Classification Search
CPC ....... G06T 11/60; G06F 3/0481; G09G 5/377; G09G 2340/10
See application file for complete search history.

(56) References Cited

U.S. PATENT DOCUMENTS 7,168,048 B1 * 1/2007 Goossen .................. G09G 5/14
345/629
7,712,046 B2 5/2010 Ngari et al.
(Continued)

FOREIGN PATENT DOCUMENTS

| CN | 102915349 A | 2/2013 |
| CN | 103473077 A | 12/2013 |

(Continued)

OTHER PUBLICATIONS

International Search Report and Written Opinion, PCT/CN2016/113224, dated Apr. 6, 2017; 7 pages.
(Continued)

*Primary Examiner* — Ryan R Yang
(74) *Attorney, Agent, or Firm* — Zhong Law, LLC

(57) ABSTRACT

A method and an apparatus of displaying a window border shadow, the method including the following steps: creating a slave window stitched to a border of a main window, wherein the main window is a non-Layered Window, and the slave window is a Layered Window (S100); adjusting a size of the slave window according to a size of the main window, and adjusting screen coordinates of the slave window according to screen coordinates of the main window (S200); and calculating a pixel point transparency for the slave window, and displaying the slave window according to the calculated result (S300). Above mentioned method sets the main window for presenting software interface to the non-Layered Window, and the slave windows stitched to the borders surrounding the main window to the Layered Win-
(Continued)

dow, thus utilizing the slave windows to create the border shadow display effect, and also decreasing memory footprint for the entire system.

12 Claims, 2 Drawing Sheets

(52) U.S. Cl.
CPC ...... *G06T 2200/24* (2013.01); *G09G 2340/10* (2013.01); *G09G 2340/12* (2013.01)

(56) References Cited

U.S. PATENT DOCUMENTS

| | | | |
|---|---|---|---|
| 7,796,141 | B2 * | 9/2010 | Sheridan ............... G06F 3/0481 345/660 |
| 2006/0031779 | A1 * | 2/2006 | Theurer ................ G06F 3/1454 715/781 |
| 2007/0139430 | A1 | 6/2007 | Korn et al. |
| 2011/0225544 | A1 * | 9/2011 | Demar .................. G06F 3/0481 715/800 |
| 2012/0042275 | A1 * | 2/2012 | Neerudu ............... G06F 3/1454 715/781 |

FOREIGN PATENT DOCUMENTS

| | | |
|---|---|---|
| CN | 103631893 A | 3/2014 |
| CN | 105930037 A | 9/2016 |
| CN | 104572271 B | 4/2018 |
| WO | 2009154910 A3 | 12/2009 |

OTHER PUBLICATIONS

The State Intellectual Property Office of People's Republic of China, Search Report, Application No. 2016104173808; 1 page.
The State Intellectual Property Office of People's Republic of China, First Office Action, Application No. 201610417380.8; 10 pages.

* cited by examiner

METHOD AND APPARATUS OF DISPLAYING WINDOW BORDER SHADOW

CROSS-REFERENCE TO RELATED APPLICATIONS

This application claims priority to International Patent Application No. PCT/CN2016/113224 filed Dec. 29, 2016, which claims priority to Chinese application No. CN 201610417380.8, filed Jun. 12, 2016, the contents of which are hereby incorporated by reference as though fully set forth herein.

TECHNICAL FIELD

The present invention relates to the field of display technology and, in particular, to a method and an apparatus of displaying a window border shadow.

BACKGROUND

Currently, in an operating system, border shadow effect of a window is often realized by making an edge area of the window appearing semi translucent. For example, in Windows system, in order to realize the border shadow display effect of the window, a traditional method is to set the window as a Layered Window through the Application Programming Interface of Microsoft 32 bits platform (Win32 API), and draw a semi translucent shadow effect on the edge of the window. However, this method of marking the window as the Layered Window to realize the window border shadow display has certain drawbacks: the Layered Window consumes a large amount of memory, and the memory footprint increases as the window area increases; and the Layered Window is poor in the rendering performance, and it is more difficult for the Layered Window to achieve the desired frame rate than a non-Layered Window in the same situation implementing the same animation effect.

SUMMARY

Based on this, it is necessary to provide a method and an apparatus of displaying the window border shadow to solve the above-identified technical problems.

A method to display a window border shadow, the method including the following steps:

creating a slave window stitched to a border of a main window, wherein the main window is a non-Layered Window, and the slave window is a Layered Window;

adjusting a size of the slave window according to a size of the main window, and adjusting screen coordinates of the slave window according to screen coordinates of the main window; and calculating a pixel point transparency for the slave window, and displaying the slave window according to the calculated result.

Correspondingly, the present invention also provides an apparatus to display a window border shadow, the apparatus including:

a window creating unit, configured to create a slave window stitched to a border of a main window, wherein the main window is a non-Layered Window, and the slave window is a Layered Window;

an adjusting unit, configured to adjust a size of the slave window according to a size of the main window, and adjust screen coordinates of the slave window according to screen coordinates of the main window; and a calculating and displaying unit, configured to calculate a pixel point transparency for the slave window, and display the slave window according to the calculated result.

Above mentioned method and apparatus of displaying the window border shadow utilize the main window for presenting software interface, and realize the border shadow display for the main window using the slave windows stitched to, and aligned with, the borders of the main window, and set the main window to a non-Layered Window while the slave window to a Layered Window. Since the main window is a non-Layered Window, its memory footprint will not increase together with the window area, thus drastically saving the memory footprint of the system. Since the area covered by the slave windows is typically smaller than that of the main window when realizing the displaying of the main window border shadow, the memory footprint of the slave windows occupies limited storage. Compared to the method of setting the main window to a Layered Window to realize the displaying of the window border shadow, the overall memory footprint of the entire system is further reduced. Moreover, since the main window is a non-Layered Window, it does not suffer the performance implications as the Layered Window, hence the method and the apparatus of displaying the window border shadow provided by the present invention have better window rendering performance.

DESCRIPTION OF EMBODIMENTS

Technical solutions of the present invention will be described in detail below with reference to the accompanying drawings and preferred embodiments.

Figure 1:
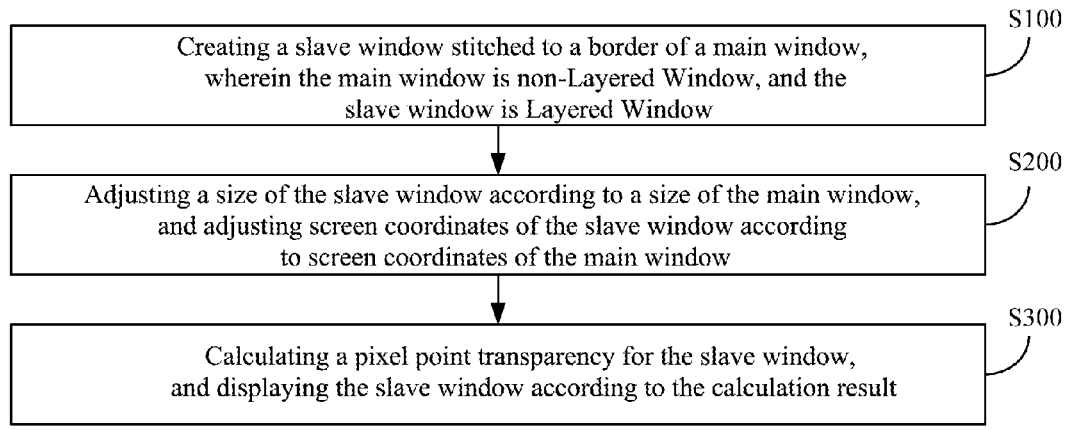
FIG. 1 is a schematic flow chart of a method of displaying a window border shadow according to one embodiment of the present invention.

In one of the embodiments, referring to FIG. 1, a method of displaying a window border shadow includes the following steps:

S100 creating a slave window stitched to a border of a main window, wherein the main window is a non-Layered Window, and the slave window is a Layered Window;

S200 adjusting a size of the slave window according to a size of the main window, and adjusting screen coordinates of the slave window according to screen coordinates of the main window; and S300 calculating a pixel point transparency for the slave window, and displaying the slave window according to a calculation result.

Specifically, the main window is a window of a display interface for normally presenting software in an operating system. In step S100, based on an already created main window, the Window API creates a slave window which is stitched to a border of the main window to construct a border shadow effect for the main window, where which border of the main window is to be stitched to the slave window and the exact number of the slave windows to be stitched to the main window may be determined according to a specific desired displaying effect of the main window border shadow. The present step may further set the main window as a non-Layered Window, and sets the slave window as a Layered Window, where the Windows system specifies a way to implement the Layered Window. Compared to the non-Layered Window, the Layered Window may present semi translucent effect, but may consume more memory space and have less than desirable rendering performance. In one specific embodiment, during creating the slave window stitched to the border of the main window, each border of the main window is stitched to one slave window. By adopting the method of creating the slave window provided by the present embodiment, the total number of the slave windows needs to be created can be decreased to the maximum extent, thus simplifying the process to display the main window border shadow and improving the displaying efficiency of the border shadow. Moreover, since each border of the main window is stitched to one slave window, the shadow displaying effect can be created for all borders of the main window, which conforms with people's visual habit better.

Figure 2:
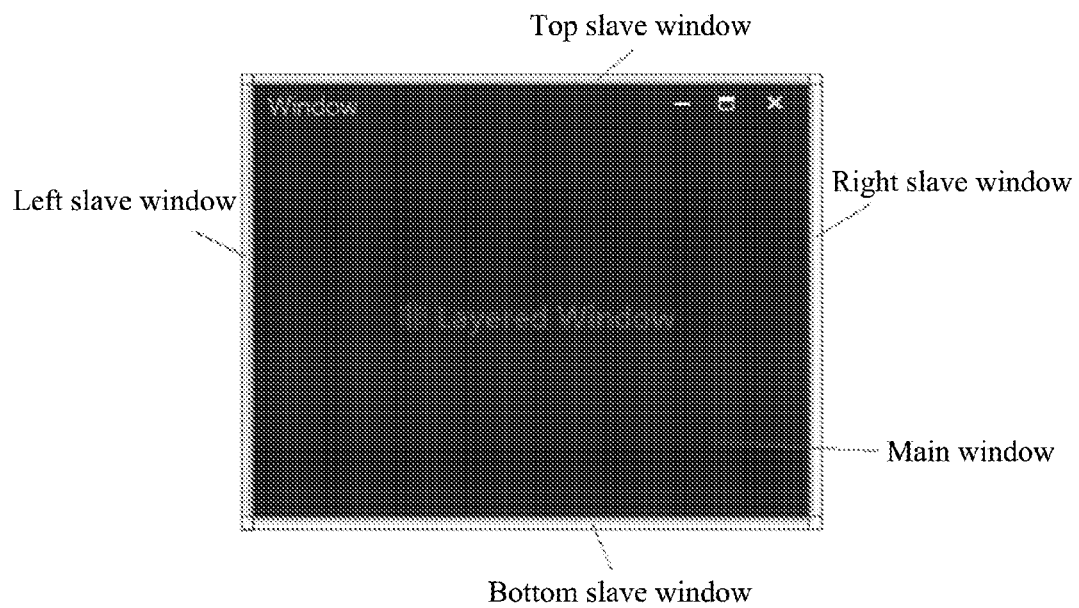
FIG. 2 is a schematic diagram of a main window and slave windows in one embodiment of the present invention.
Figure 3:
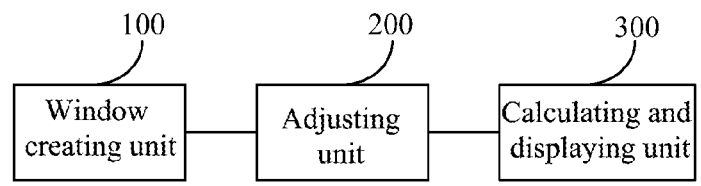
FIG. 3 is a schematic structural diagram of an apparatus of displaying a window border shadow according to one embodiment of the present invention.

In step S200, a size of the slave window is adjusted according to a size of the main window, and screen coordinates of the slave window are adjusted according to screen coordinates of the main window. The following takes as an example a typical main window with four borders, assuming that four slave windows stitched to different borders of the main window are created, and step S200 is described as follows:

In one aspect, the size (including the length and/or the width) of each slave window is respectively adjusted according to the size (including the length and/or the width) of the main window. Specifically, each slave window is labeled as a top slave window, a bottom slave window, a left slave window and a right slave window respectively. As shown in FIG. 2, the length and width of the main window are labeled as window.length and window.width respectively, the width of the top slave window is labeled as radius.top, the width of the bottom slave window is labeled as radius.bottom, the width of the left slave window is labeled as radius.left, and the width of the right-slave window is labeled as radius.right. According to FIG. 2, the length of the top slave window stitched to a top border of the main window and the length of the bottom slave window stitched to a bottom border of the main window are the same, which are radius.left+window.length+radius.right, and the length of the left slave window stitched to a left border of the main window and the length of the right slave window stitched to a right border of the main window are the same, which are radius.top+window.width+radius.bottom, where the width of each slave window radius.top, radius.bottom, radius.left, and radius.right may be set flexibly according to the size of the main window and the border shadow display effect. In one specific embodiment, when the number of the slave windows is greater than one, the widths of each slave window are set to be the same. Taking the above four slave windows as an example, the widths of each slave window are the same, i.e. radius.top=radius.bottom=radius.left=radius.right. Because of the identical width of each slave window, the symmetry of the windows may simplify calculation of the pixel point transparency of the slave window, thus improving the efficiency of the shadow display of the main window border.

In one further aspect, the screen coordinates of the slave window are adjusted according to the screen coordinates of the main window. Specifically, in the field of display technology, a coordinate system is established by setting an upper left corner of the display screen as the origin of coordinates, a horizontal right direction as a positive direction of x-axis, and a vertical down direction relative to the x-axis as a positive direction of the y-axis. The screen coordinates of the main window refer to the coordinate position of the upper left corner of the main window in the established coordinate system of the screen. For example, the screen coordinates of the main window are labeled as (window.left, window.top), and the screen coordinates of the slave window may be calculated according to the screen coordinates of the main window. For example, using the top slave window shown in FIG. 2 as an example, the coordinate position of the upper left corner of the top slave window in the established coordinate system may be calculated according to the screen coordinates of the main window and the size of the slave window. The coordinate position of the upper left corner of the top slave window can be calculated as (window.left−radius.left, window.top−radius.top). Namely, the screen coordinates of the top slave window are (window.left−radius.left, window.top−radius.top), and the screen coordinates of other slave window are calculated in a similar manner.

Finally, in step S300, the pixel point transparency of the slave window is calculated, and the slave window is displayed according to the calculated result. After adjusting the size and the screen coordinates of the slave window in step S200, it may calculate the transparency of the pixel points included in the slave window, that is, to perform pixel point transparency calculation for the slave window, thereby calculating and setting the transparencies of the pixel points of the slave window to realize the effect of the main window border shadow display. In the process of performing pixel point transparency calculation for each slave window, as one specific implementation, each border of the main window is stitched to one slave window, and each slave window is labeled as a first slave window, a second slave window, a third slave window, or a fourth slave window, respectively. Regarding the first slave window and the third slave window, the transparencies of a first row of pixel points of the first slave window and the third slave window are set to 1, respectively, and the transparencies of other rows of pixel points are set to decrease progressively from 1 until 0 for the last row of pixel points. Regarding the second slave window and the fourth slave window, the transparencies of a first column of pixel points of the second slave window and the fourth slave window are set to 1, respectively, and the transparencies of other columns of pixel points are set to decrease progressively from 1 until 0 for the last row of pixel points.

There are various methods to calculate the transparencies of pixel points for a slave window. In one of the possible methods, the transparencies of the pixel points of one side of the each slave window stitched to the main window border (i.e., the first row of pixel points or the first column of pixel points) are set to 1, the transparencies of the pixel points of an opposite side of the each slave window stitched to the main window border (i.e., the last row of pixel points or the last column of pixel points) are set to 0, and the transparencies of other rows or other columns of pixel points are obtained by successively decrementing from 1 until 0. For example, using a slave window stitched to the left side of the main window (left slave window) as an example, the width of the slave window is radius.left; that is, there are radius.left columns of pixel points. The transparencies of the first column of pixel points of the side of the slave window stitched to the main window is set to 1 (i.e., completely opaque), and the transparencies of each column of pixel points after the first column of pixel points are successively decremented, until the transparency for the (radius.left)-th column of pixel points is set to 0 (i.e., completely transparent). Other than the first column of pixel points and the (radius.left)-th column of pixel points, the transparencies of the other columns are semi-transparent. In a similar way, the calculation of the pixel point transparency is performed respectively for other slave windows. After obtaining the transparency of each pixel point in each slave window, each slave window is displayed according to the calculated transparencies. That is, the pixel points in each slave window are rendered to pixel points having different transparencies, so that all slave windows obtained after the rendering are stitched to the borders surround the main window, eventually creating the border shadow display result around the main window.

When calculating the pixel point transparencies of slave windows of the same width, according to the principle of symmetry, some of the calculation workload of the pixel point transparency of the slave windows can be reduced, thus improving the processing speed of the window border shadow display. Moreover, since the effects of the window border shadow display may be in many forms such as, for example, only displaying the shadow of one border of the window, or the shadows of the borders having different grayscales, etc., and may be set by the user according to user's needs or preferences, the specific calculation method adopted in calculating the pixel point transparencies of each slave window may be modified according to the expected shadow display effect of the window border.

The method of displaying the window border shadow provided in the present embodiment presents a software interface in the main window and realizes the border shadow display for the main window using the slave windows stitched to, and aligned with, the borders of the main window, and sets the main window to a non-Layered Window while the slave windows is set to a Layered Window. Since the main window is the non-Layered Window, its memory footprint will not increase proportionally with the window area, thus significantly saving the memory footprint of the system. Since, when realizing the displaying of the main window border shadow, the area covered by the slave windows is typically smaller than that of the main window, the memory footprints of the slave windows are limited. Compared to the method of setting the main window to the Layered Window to realize the displaying of the window border shadow, the overall memory footprint of the entire system is reduced. Moreover, since the main window is the non-Layered Window, it does not suffer the performance impacts as the Layered Window, hence the method and the apparatus of displaying the window border shadow provided by the present invention have better window rendering performance.

As one specific embodiment, the method of displaying the window border shadow further includes the following steps: monitoring a size change in the main window, and adjusting a size of the slave window according to the amount of the size change detected. In the present embodiment, the Window API may be used to monitor the change in the size (including length and width) of the main window. When a change in the length or width of the main window is detected by the Window API, the size of the window (including the length and width) of the slave window is readjusted according to the detected size change, such that the slave window may remain being stitched to the main window and hence matches the main window. For example, when the Window API detects that the length of the main window has increased by $\Delta$, the lengths of corresponding slave windows will also need to be increased by $\Delta$ to ensure that the slave windows match the main window, thereby ensuring the slave windows remain stitched to the main window border to form the border shadow of the main window. By implementing the present embodiment, when the length and/or width of the main window are changed, the length and/or width of the slave window are changed accordingly, so the shadow display effect of the main window does not change with the scaling of the main window, and a normal display effect of the window border shadow is further ensued.

In one specific embodiment, the method to display the window border shadow may further include the following steps: monitoring for change in the screen coordinates of the main window, and adjusting the screen coordinates of the slave windows according to the amount of coordinate change detected. When the user changes the position of the main window on the display screen, that is, changes the screen coordinates of the main window, the present embodiment operates through the event to monitor the change in the screen coordinates of the main window to adjust the screen coordinates of the slave windows according to the amount of the coordinate change in the monitored main window. For example, a coordinate system is established by an upper left corner of the display screen as the origin of coordinates, a horizontal right direction as a positive direction of x-axis, and a vertical down direction relative to the x-axis as a positive direction of the y-axis. The Window API detects that the screen coordinates of the main window have changed to (window.left+window.x, window.top+window.y) from the original (window.left, window.top). In order to ensure that the slave window can match the main window in real time, the screen coordinates of the slave window also need to be adjusted. The horizontal coordinate of the screen coordinates of the slave window needs to be increased by window.x, and the vertical coordinate needs to be increased by window.y, so as to ensure that the slave window can match the main window. Thus, the slave window being stitched to the main window border to form the border shadow of the main window is ensured. By implementing the present embodiment, when the screen coordinates of the main window are changed, the screen coordinates of the slave window are changed accordingly, so that the shadow display effect of the main window does not change when the main window changes its position in the screen, thus ensuring an expected display effect of the window border shadow.

As one specific embodiment, the method of displaying the window border shadow further includes the following steps: hiding a displayed slave window when detecting a window maximization instruction or a window minimization instruction of the main window. In the present embodiment, the event of whether receiving the window maximization instruction or the window minimization instruction of the main window is monitored. When the window maximization instruction of the main window is detected, since the main window will be displayed as a full-screen on the display screen in this case, and the border of the main window will coincide with the boundary of the display screen, the border shadow of the main window does not need to be displayed. Therefore, when the window maximization instruction of the main window is detected, the slave window is hidden, and the rendering of the slave window is stopped, thereby releasing system memory resource. When the window minimization instruction of the main window is detected, since the main window will no longer be displayed on the screen at this time, there is no need to display the border shadow of the main window. When the window minimization instruction of the main window is detected, the displayed slave window is hidden, and the rendering of the slave window is stopped, thereby releasing the system memory resource. The present embodiment directs at alternative display states of the main window in which the main window is maximized or minimized by hiding the displayed slave windows, that is, by cancelling the border shadow of the main window, so that the system memory resource is conserved.

Correspondingly, the present invention also provides an apparatus of displaying the window border shadow, which includes a window creating unit 100, an adjusting unit 200, and a calculating and displaying unit 300. The above units and their functions are individually described below:

The window creating unit 100 is configured to create a slave window stitched at a border of a main window, where the main window is a non-Layered Window, and the slave window is a Layered Window. The main window is a window of a display interface for normally presenting software in an operating system. Based on an already created main window, the window creating unit 100 operates through the Window API to create a slave window which is stitched to a border of the main window to construct a border shadow effect for the main window, where which border of the main window is to be stitched to the slave window and a number of the slave windows to be stitched to the main window may be determined according to a specific desired displaying effect of the main window border shadow. The creating unit 100 may set the main window as a non-Layered Window, and set the slave window to be a Layered Window, where the Layered Window is a way to implement the window as defined in the Windows system. Compared to the non-Layered Window, the Layered Window may present semi translucent effect, but consume more memory and have less-than-desirable rendering performance. As one specific embodiment, during creating the slave window stitched to the border of the main window by the creating unit 100, the creating unit 100 makes each border of the main window to be stitched to one slave window. By adopting the method of creating the slave windows by the creating unit 100 as provided in the present embodiment, a total number of the slave window need to be created is minimized, thus simplifying the process of displaying the main window border shadow and improving the displaying efficiency of the border shadow oved. Moreover, since each border of the main window is stitched to one slave window, the shadow displaying effect can be created for all borders of the main window, which conforms with people's visual habit better.

The adjusting unit 200 is configured to adjust a size of the slave window according to a size of the main window, and adjust screen coordinates of the slave window according to screen coordinates of the main window. The following uses a typical main window with four borders as an example, assuming that four slave windows stitched to different borders of the main window are created by the creating unit 100, and the adjusting unit 200 is described as follows:

In one aspect, the adjusting unit 200 may respectively adjust the size (including the length and/or the width) of each slave window according to the size (including the length and/or the width) of the main window, specifically, labeling each slave window as a top slave window, a bottom slave window, a left slave window and a right slave window respectively. As shown in FIG. 2, the length and width of the main window are labeled as window.length and window.width respectively, the width of the top slave window is labeled as radius.top, the width of the bottom slave window is labeled as radius.bottom, the width of the left slave window is labeled as radius.left, and the width of the right-slave window is labeled as radius.right. According to FIG. 2, the length of the top slave window stitched to a top border of the main window and the length of the bottom slave window stitched to a bottom border of the main window are the same, which are radius.left+window.length+radius.right, and the length of the left slave window stitched to a left border of the main window and the length of the right slave window stitched to a right border of the main window are the same which are radius.top+window.width+radius.bottom, where the width of each slave window radius.top, radius.bottom, radius.left, and radius.right may be set flexibly according to the size of the main window and the border shadow display effect. In one specific embodiment, when the number of the slave windows is greater than one, the adjusting unit 200 may set the widths of each slave window to be the same. Taking the above four slave windows as an example, the widths of each slave window are the same, i.e. radius.top=radius.bottom=radius.left=radius.right. Because of the identical width of each slave window, a calculation of the pixel point transparency of the slave window by the calculating and displaying unit 300 can be simplified according to the symmetry of the window, thus improving the efficiency of the shadow display of the main window border.

In one further aspect, the screen coordinates of the slave window are adjusted according to the screen coordinates of the main window by the adjusting unit 200. Specifically, the adjusting method of the adjusting unit 200 for the screen coordinates of the slave window is as follows: in the field of display technology, a coordinate system is established by setting an upper left corner of the display screen as the origin of coordinates, a horizontal right direction as a positive direction of x-axis, and a vertical down direction with respect to the x-axis as a positive direction of the y-axis. The screen coordinates of the main window refer to the coordinate position of the upper left corner of the main window in the established coordinate system of the screen. For example, the screen coordinates of the main window are labeled as (window.left, window.top), and the screen coordinates of the slave window may be calculated according to the screen coordinates of the main window. For example, using the top slave window shown in FIG. 2 as an example, the coordinate position of the upper left corner of the top slave window in the established coordinate system may be calculated according to the screen coordinates of the main window and the size of the slave window. The coordinate position of the upper left corner of the top slave window can be calculated as (window.left−radius.left, window.top−radius.top). Namely, the screen coordinates of the top slave window are (window.left−radius.left, window.top−radius.top), and the screen coordinates of other slave windows are calculated in a similar manner.

The calculating and displaying unit 300 is configured to calculate a pixel point transparency of the slave window, and display the slave window according to a calculated result. After adjusting the size and the screen coordinates of the slave window, the calculating and displaying unit 300 may calculate the transparency of the pixel points included in the slave window, or, to perform pixel point transparency calculation for the slave window. The calculating and setting the transparencies of the pixel points of the slave window can realize the effect of the main window border shadow display. In a specific embodiment, the calculating and displaying unit 300 includes a transparency calculating unit used to calculate the transparencies of each slave window including the transparencies of each pixel therein. Particularly, each border of the main window is stitched to one slave window, and each respective slave window is labeled as a first slave window, a second slave window, a third slave window, and a fourth slave window respectively. Regarding the first slave window and the third slave window, the transparencies of a first row of pixel points of the first slave window and the third slave window are set to 1, respectively, and the transparencies of pixel points of the other rows are set to decrease progressively from 1 until 0 for the last row of pixel points. Regarding the second slave window and the fourth slave window, the transparencies of a first column of pixel points of the second slave window and the fourth slave window are set to 1 individually, and the transparencies of other columns of pixel points are set to decrease progressively from 1 until 0 for the last row of pixel points.

There are various methods to calculate the transparencies of pixel points for a slave window. In one of the possible methods, the transparencies of the pixel points of one side of the each slave window stitched to the main window border (i.e., the first row of pixel points or the first column of pixel points) are set to 1, the transparencies of the pixel points of an opposite side of the each slave window stitched to the main window border (i.e., the last row of pixel points or the last column of pixel points) are set to 0, and the transparencies of other rows or other columns of pixel points are obtained by successively decrementing from 1 until 0. For example, using a slave window stitched to the left side of the main window (left slave window) as an example, the width of the slave window is radius.left; that is, there are radius.left columns of pixel points. The transparencies of the first column of pixel points on the side of the slave window stitched to the main window are set to 1 (i.e., completely opaque), and the transparencies of each column of pixel points after the first column of pixel points are successively decremented until the transparencies of the (radius.left)-th column of pixel points are 0 (i.e., completely transparent). Other than the first column of pixel points and the (radius.left)-th column of pixel points, the transparencies of the other columns are semi-transparent. In a similar way, the calculation of the pixel point transparency is performed respectively for other slave windows. After obtaining the transparency of each pixel point in each slave window, each slave window is displayed according to the calculated transparencies by the calculating and displaying unit 300. That is, the pixel points in each slave window are rendered to pixel points having different transparencies, so that all slave windows obtained after the rendering are stitched to the borders surrounding the main window, eventually creating the border shadow display result around the main window.

In the apparatus of displaying the window border shadow, when the widths of each of the slave windows are the same, the calculation of the pixel point transparency of certain slave windows by the transparency calculating unit can be reduced by using the principle of symmetry, thus improving the processing speed of the window border shadow display. Moreover, since the window border shadow display effect may be in many forms such as, for example, only displaying the shadow of one border of the window, or the shadows of the borders having different grayscales, etc., and may be set by the user according to user's needs or preferences, the specific calculation method adopted in calculating the pixel point transparencies of each slave window may be modified according to the expected shadow display effect of the window border.

The apparatus of displaying the window border shadow provided in the present embodiment presents a software interface in the main window, and realizes the border shadow display of the main window using the slave windows stitched to, and matched with, the borders of the main window, and sets the main window to a non-Layered Window while the slave window is set to a Layered Window. Since the main window is a non-Layered Window, its memory footprint will not increase proportionally with the window area, thus significantly saving the memory footprint of the system. Since when realizing the displaying of the main window border shadow, the area covered by the slave windows is typically smaller than that of the main window, the memory footprints of the slave windows are limited. Compared to the method of setting the main window to the Layered Window to realize the displaying of the window border shadow, the overall memory footprint of the entire system is reduced. Moreover, since the main window is the non-Layered Window, it does not suffer the performance impacts as the Layered Window, hence the method and the apparatus of displaying the window border shadow provided by the present invention have better window rendering performance.

As one specific embodiment, the apparatus of displaying the window border shadow further includes a monitoring unit, and the monitoring unit and its function will be described in detail as follows:

The monitoring unit monitors a size change in the main window, and adjusts a size of the slave window according to the amount of the size change detected. In the present embodiment, the monitoring unit may use the Window API to monitor the change in the size (including length and width) of the main window. When detecting a change in the length or width of the main window using the Window API, the monitoring unit may readjust the size of the window (including the length and width) of the slave window according to the detected size change, such that the slave window may remain being stitched to the main window and hence matches the main window. For example, when the monitoring unit detects that the length of the main window has increased by $\Delta$, the lengths of corresponding slave windows may also need to be increased by $\Delta$ to ensure that the slave windows match the main window, thereby ensuring the slave window remain stitched to the main window border to form the border shadow of the main window. By implementing the present embodiment, when the length and/or width of the main window are changed, the length and/or width of the slave window change accordingly, so the shadow display effect of the main window does not change with the scaling of the main window, further ensuring a normal display effect of the window border shadow.

Moreover, the monitoring unit further monitors the screen coordinates change in the main window, and adjusts the screen coordinates of the slave window according to the amount of coordinate change detected. When the user changes the position of the main window on the display screen, that is, changes the screen coordinates of the main window, the monitoring unit of the present embodiment detects the event of the change in the screen coordinates of the main window, and the adjusting unit adjusts the screen coordinates of the slave windows according to the amount of the coordinate change in the monitored main window. For example, a coordinate system may be established by setting an upper left corner of the display screen as the origin of coordinates, a horizontal right direction as a positive direction of x-axis, and a vertical down direction relative to the x-axis as a positive direction of the y-axis. The Window API detects that the screen coordinates of the main window have changed to (window.left+window.x, window.top+window.y) from the original (window.left, window.top). To ensure that the slave window can match the main window in real time, the screen coordinates of the slave window may also need to be adjusted. The adjusting unit increases the horizontal coordinate of the screen coordinates of the slave window by window.x, and increases the vertical coordinate by window.y, so as to ensure that the slave window can match the main window, thus ensuring the slave window being stitched to the main window border to form the border shadow of the main window. By implementing the present embodiment, when the screen coordinates of the main window are changed, the screen coordinates of the slave window change accordingly, so as to not causing the shadow display effect of the main window to change when the main window changes its position in the screen, thus ensuring an expected display effect of the window border shadow.

The calculating and displaying unit may hide a displayed slave window when the monitoring unit detects a window maximization instruction or a window minimization instruction of the main window. In the present embodiment, the monitoring unit may monitor whether the detected event is the window maximization instruction or the window minimization instruction of the main window. When the window maximization instruction of the main window is detected by the calculating and displaying unit, since the main window will be displayed in the full-screen mode on the display screen at this time, and the border of the main window will coincide with the boundary of the display screen, the calculating and displaying unit does not need to display the border shadow of the main window. Therefore, when the monitoring unit detects the window maximization instruction of the main window, the calculating and displaying unit hides the slave window, thereby stopping the rendering of the slave window and releasing the system memory resource. When the monitoring unit detects the window minimization instruction of the main window, since the main window will no longer be displayed on the screen at this time, there is no need to display the border shadow of the main window by the calculating and displaying unit. When detecting the window minimization instruction of the main window, the calculating and displaying unit may hide the displayed slave window and stop the rendering of the slave window, thereby releasing the system memory resource. The present embodiment may include alternative display states of the main window in which the main window is maximized or minimized by hiding the displayed slave windows, that is, by cancelling the border shadow of the main window, thus further saving the system memory resource.

For the implementation of the specific functions of each unit in the apparatus of displaying the window border shadow of the present invention, reference may be made to the implementation method described in the embodiments of the method of displaying the window border shadow, which will not be repeated herein.

The technical features of the above embodiments may be re-combined arbitrarily. For the sake of brevity of the description, all possible combinations of the technical features in the above embodiments are not described. However, as long as there is no contradiction in a combination of these technical features, the combination should be deemed within the scope described in this specification.

The above embodiments merely represent several embodiments of the present invention, which are described in more specific and in detail, but it should be understood that the scope of the present invention patent is not limited therein. It should be noted that, for those skilled in the art, other variations and improvements may still be made without departing from the concept of the present invention, and they should fall within the protection scope of the present invention. Therefore, the protection scope of the present invention patent shall be subject to the appended claims.

The invention claimed is:

1. A method for displaying a window border shadow, comprising:
   creating a slave window stitched to a border of a main window, wherein the main window is a non-Layered Window, and the slave window is a Layered Window;
   adjusting a size of the slave window according to a size of the main window, and adjusting screen coordinates of the slave window according to screen coordinates of the main window; and
   calculating a pixel point transparency for the slave window, and displaying the slave window according to the calculation result.

2. The method of displaying a window border shadow according to claim 1, further comprising:
   monitoring for a size change in the main window, and adjusting the size of the slave window according to an amount of the detected size change.

3. The method of displaying a window border shadow according to claim 1, further comprising:
   monitoring for a change in the screen coordinates of the main window, and adjusting the screen coordinates of the slave window according to an amount of the detected coordinate change.

4. The method of displaying a window border shadow according to claim 1, further comprising:
   hiding a displayed slave window responsive to detecting one of a window maximization instruction or a window minimization instruction of the main window.

5. The method of displaying a window border shadow according to claim 1, wherein each border of the main window is stitched to a respective one slave window.

6. The method of displaying a window border shadow according to claim 5, wherein a process of calculating pixel point transparencies for the slave window comprises:
   labeling each of the slave windows as one of a first slave window, a second slave window, a third slave window, or a fourth slave window;
   for the first slave window and the third slave window, setting transparencies of a first row of pixel points of the first slave window and the third slave window to 1, respectively, and setting transparencies of other rows of pixel points to successively decrement from 1 until 0 for a last row of pixel points, and
   for the second slave window and the fourth slave window, setting transparencies of a first column of pixel points of the second slave window and the fourth slave window to 1, respectively, and setting transparencies of other columns of pixel points to successively decrement from 1, until 0 for a last column of pixel points.

7. The method of displaying a window border shadow according claim 1, wherein when a number of the slave windows is more than one, and widths of individual slave windows are the same.

8. An apparatus for displaying a window border shadow, comprising:
   a window creating unit to create a slave window stitched to a border of a main window, wherein the main window is a non-Layered Window, and the slave window is a Layered Window;
   an adjusting unit to adjust a size of the slave window according to a size of the main window, and adjust screen coordinates of the slave window according to screen coordinates of the main window; and a calculating and displaying unit, configured to calculate a pixel point transparency for the slave window, and display the slave window according to the calculation result.

9. The apparatus of displaying a window border shadow according claim 8, further comprising a monitoring unit to monitor for a size change in the main window, and to adjust the size of the slave window according to an amount of the detected size change.

10. The apparatus of displaying a window border shadow according claim 8, wherein the calculating and displaying unit comprises a transparency calculating unit that:

when each border of the main window is stitched to one slave window, label each slave window as one of a first slave window, a second slave window, a third slave window, or a fourth slave window, respectively;

for the first slave window and the third slave window, set transparencies of a first row of pixel points of the first slave window and the third slave window to 1, respectively, and set transparencies of other rows of pixel points to successively decrement from 1 until 0 for the last row of pixel points; and for the second slave window and the fourth slave window, set transparencies of a first column of pixel points of the second slave window and the fourth slave window to 1, respectively, and set transparencies of other columns of pixel points to successively decrement from 1 until 0 for the last column of pixel points.

11. The apparatus of displaying a window border shadow according claim 8, further comprising a monitoring unit to monitor for a change in the screen coordinates of the main window, and to adjust the screen coordinates of the slave window according to an amount of the detected coordinate change.

12. The apparatus of displaying a window border shadow according claim 8, further comprising a monitoring unit, wherein the calculating and displaying unit hides a displayed slave window when the monitoring unit detects a window maximization instruction or a window minimization instruction of the main window.

* * * * *